US008653159B2

(12) United States Patent
Minagawa et al.

(10) Patent No.: US 8,653,159 B2
(45) Date of Patent: Feb. 18, 2014

(54) APPARATUS FOR HEAT-TREATING TONER AND METHOD FOR PRODUCING TONER

(75) Inventors: Hironori Minagawa, Moriya (JP); Yuichi Mizo, Toride (JP); Takeshi Ootsu, Toride (JP); Junichi Hagiwara, Tsuchiura (JP); Daisuke Ito, Tsuchiura (JP); Kunihiko Kawakita, Iga (JP); Yasushi Tamura, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/410,592

(22) Filed: Mar. 2, 2012

(65) Prior Publication Data

US 2012/0231382 A1 Sep. 13, 2012

(30) Foreign Application Priority Data

Mar. 9, 2011 (JP) ................................ 2011-051787

(51) Int. Cl.
*C08F 6/00* (2006.01)

(52) U.S. Cl.
USPC ........ 523/306; 422/307; 430/137.1; 523/223; 523/330; 523/313; 523/323

(58) Field of Classification Search
USPC .......... 422/307; 523/223, 306, 330, 313, 323; 430/137.1
See application file for complete search history.

(56) References Cited

U.S. PATENT DOCUMENTS

2011/0143277 A1* 6/2011 Shiotari et al. ............ 430/110.3

FOREIGN PATENT DOCUMENTS

| | | | |
|---|---|---|---|
| CN | 101910954 | A | 12/2010 |
| JP | 2000-029241 | A | 1/2000 |
| JP | 2000-140661 | A | 5/2000 |
| JP | 2004-018290 | A | 1/2004 |
| JP | 2004-189845 | A | 7/2004 |

* cited by examiner

*Primary Examiner* — Peter Vajda

(74) *Attorney, Agent, or Firm* — Canon U.S.A., Inc. IP Division

(57) ABSTRACT

An apparatus for heat-treating a toner includes a raw-material supply unit configured to supply a toner treatment space with a raw-material toner, a hot-air supply unit configured to heat-treat the raw-material toner in the toner treatment space, a suction and ejection unit configured to eject hot air used for the heat treatment of the raw-material toner, and a waste-heat recovery and supply unit configured to recover heat from the hot air ejected by the suction and ejection unit and supply the hot-air supply unit with the recovered heat.

5 Claims, 6 Drawing Sheets

APPARATUS FOR HEAT-TREATING TONER AND METHOD FOR PRODUCING TONER

BACKGROUND OF THE INVENTION

1. Field of the Invention

The present invention relates to an apparatus for heat-treating a toner, the apparatus being used to produce a toner for use in an image forming method, for example, an electrophotographic method, an electrostatic recording method, an electrostatic printing method, or a toner jet recording method, and relates to a method for producing a toner.

2. Description of the Related Art

Hitherto, apparatuses for heat-treating toner have been used in processes for producing toner in order to form toner particles into a spherical shape. In apparatuses for heat-treating toner in the related art, techniques for heating and forming toner particles into a spherical shape using hot air are used. In such an apparatus for heat-treating toner, typically, outside air is taken and heated with, for example, a heater to produce hot air.

Japanese Patent Laid-Open No. 2004-189845 discloses a heat-treatment apparatus for heat-treating ground toner particles to form the toner particles into an appropriate spherical shape in order to produce toner having an appropriate degree of circularity.

SUMMARY OF THE INVENTION

In recent years, there has been a trend toward the reduction of environmental loads. Energy consumption and improvement in thermal energy efficiency are issues of concern. In the apparatus for heat-treating toner described in Japanese Patent Laid-Open No. 2004-189845, a high flow rate of hot air having a high temperature is needed to heat-treat a large amount of toner, thus consuming a larger amount of heat. Furthermore, in order to suppress the accumulation of heat in the apparatus, most of thermal energy imparted to the hot air is released outside the system. As described above, such an apparatus for gloving toner by heat treatment has problems with energy consumption and thermal energy efficiency.

One disclosed aspect of the present invention provides an apparatus for heat-treating a toner, the apparatus suppressing energy consumption to reduce the environmental load, and provides a method for producing a toner.

According to one disclosed aspect of the invention, an apparatus for heat-treating a toner includes a raw-material supply unit configured to supply a toner treatment space with a raw-material toner, a hot-air supply unit configured to heat-treat the raw-material toner in the toner treatment space, a suction and ejection unit configured to eject hot air used for the heat treatment of the raw-material toner, and a waste-heat recovery and supply unit configured to recover heat from the hot air ejected by the suction and ejection unit and supply the hot-air supply unit with the recovered heat.

According to aspects of the present invention, electricity required for the heat treatment can be reduced during the operation of the apparatus to reduce energy for production, thus resulting in a reduction in environmental load.

Further features of the present invention will become apparent from the following description of exemplary embodiments with reference to the attached drawings.

DESCRIPTION OF THE EMBODIMENTS

Figure 1:
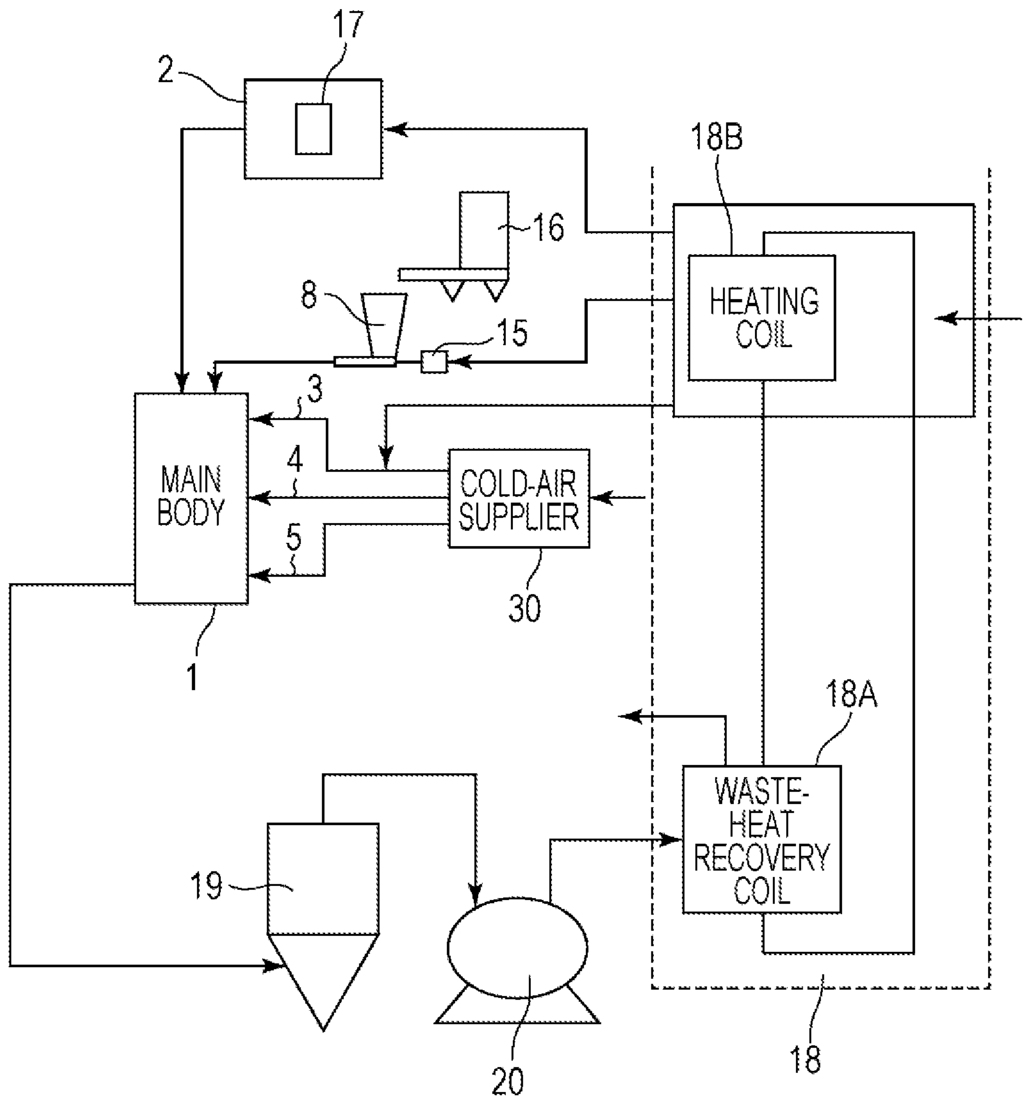
FIG. 1 illustrates an exemplary procedure in an apparatus for heat-treating a toner according to aspects of the present invention.

FIG. 1 illustrates an exemplary procedure in an apparatus for heat-treating a toner according to aspects of the present invention. A main body 1 of the heat-treatment apparatus includes a hot-air supply unit 2, a raw-material supply unit 8, a first cold-air supply unit 3, a second cold-air supply unit 4, a third cold-air supply unit 5, which are arranged on the upstream side, and a toner recovery unit 19 and a blower 20, which are arranged on the downstream side.

The raw-material supply unit 8 conveys a raw-material toner with a compressed gas into a toner treatment space in the main body 1 of the heat-treatment apparatus. The term "raw-material toner" used in aspects of the present invention indicates a toner which is supplied to the apparatus for heat-treating a toner and which is to be subjected to heat treatment. The toner treatment space indicates a substantially cylindrical-shaped space in the main body of the heat-treatment apparatus. The raw-material toner is subjected to heat treatment in this space. To quantitatively feed the raw-material toner from the raw-material supply unit 8 to the toner treatment space, a compressed-gas supply unit 15 is arranged downstream of a feeder 16.

The hot-air supply unit 2 heats outside air with an inner heater 17 and supplies hot air to the toner treatment space. Particles of the raw-material toner are formed into a spherical shape in the toner treatment space with the hot air. The main body 1 of the heat-treatment apparatus includes the cold-air supply units 3, 4, and 5 to cool the heat-treated toner. The cold-air supply units 3, 4, and 5 are supplied with cold air from a cold-air supplier 30. The toner heat-treated in the toner treatment space is recovered with the toner recovery unit 19. Examples of the toner recovery unit include cyclones and double-clones. The hot air used for the heat treatment of the raw-material toner is sucked with the blower 20, which is a suction and ejection unit, and is ejected outside the system of the heat-treatment apparatus.

In the apparatus for heat-treating a toner according to aspects of the present invention, waste heat emitted outside the system using the blower 20 is recovered with a waste-heat recovery and supply unit and is returned to the hot-air supply unit 2.

Figure 2:
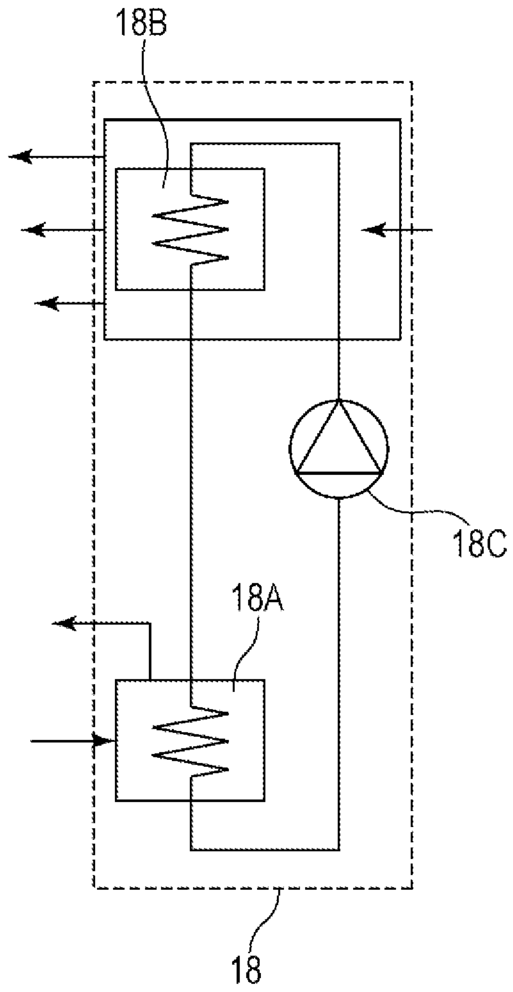
FIG. 2 is an explanatory drawing of a waste-heat recovery and supply unit.

A waste-heat recovery and supply unit 18 used in aspects of the present invention will be described below. The waste-heat recovery and supply unit 18 may include a waste-heat recovery device and a waste-heat supply device. Heat transfer from the waste-heat recovery device to the waste-heat supply device may be performed with a heat transfer device. FIG. 2 illustrates an exemplary structure of the waste-heat recovery and supply unit 18 used in aspects of the present invention. The temperature of hot air discharged from the blower 20 is in the range of about 70° C. to about 100° C., depending on operating conditions. A waste-heat recovery coil 18A, which serves as a waste-heat recovery device, is arranged so as to be located in hot air discharged from the blower 20 (for example, in the vicinity of the air outlet of the blower).

The waste-heat recovery and supply unit 18 illustrated in FIG. 2 includes the waste-heat recovery coil 18A serving as a waste-heat recovery device, a heating coil 18B serving as a waste-heat supply device, and a pump 18C, these components being connected through pipes. The pipes are filled with a liquid (water) serving as a heat transfer medium. Waste heat from the blower 20 heats the liquid in the waste-heat recovery coil 18A. The pump 18C circulates the liquid in the pipes. Heat from the heated liquid is dissipated at the heating coil 18B in contact with outside air. The heating coil 18B is arranged in an outside-air inlet portion upstream of the hot-air supply unit 2. Thus, in the steady state after the apparatus starts to operate and a certain period of time has elapsed, air in the vicinity of the heating coil 18B is heated, and the heated air is fed to the heater 17 of the hot-air supply unit 2. This enables the power consumption of the heater 17 to be reduced. The amount of heat recovered depends on the specifications of the coil and may be appropriately selected.

Figure 3:
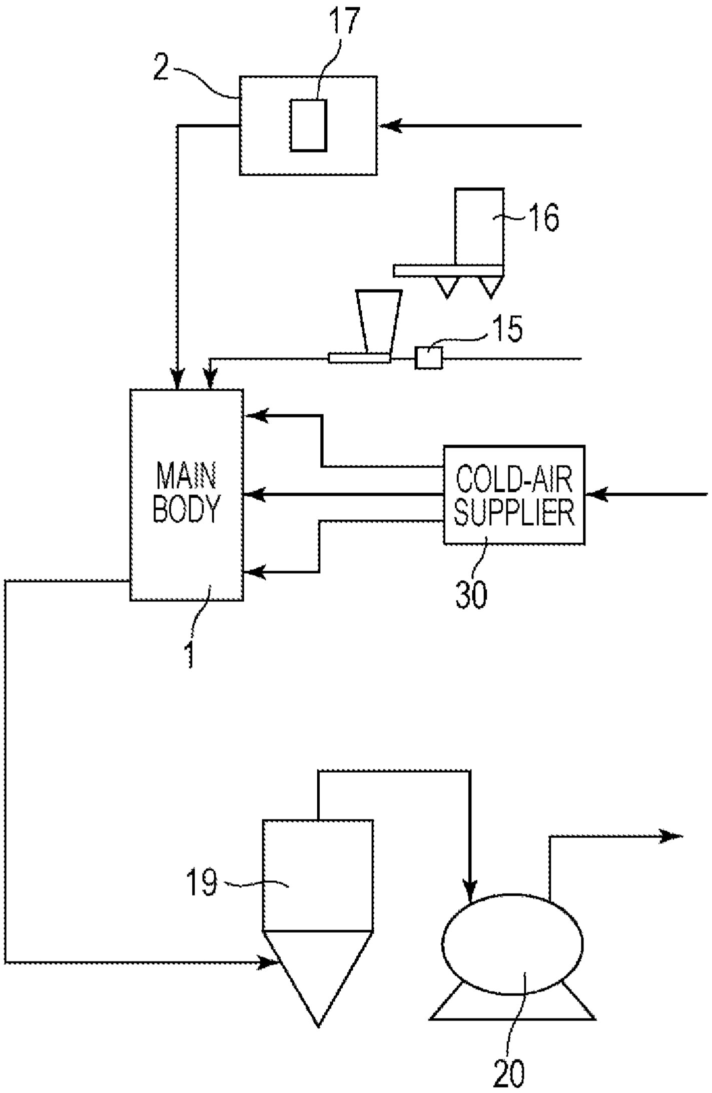
FIG. 3 illustrates a procedure in an apparatus for heat-treating a toner in the related art.

FIG. 3 illustrates a procedure in an apparatus for heat-treating a toner in the related art, in which the apparatus does not include a waste-heat recovery and supply unit. In the hot-air supply unit 2, when supplied outside air is heated with the heater 17, the temperature increase required to heat the air to a predetermined temperature is different between the case where the waste-heat recovery and supply unit 18 is not used and the case where the waste-heat recovery and supply unit 18 is used. Suppose outside air having a temperature of 0° C. in the winter months and so forth is heated to 200° C. In the case where the waste-heat recovery and supply unit 18 is not used, the temperature of the air must be increased by 200° C. using the heater 17 and stabilized. Furthermore, if a higher air flow rate is set, a larger amount of heat is needed. In the case where the waste-heat recovery and supply unit 18 is used, outside air is supplied to the heater 17 while being heated. Thus, if outside air is heated to, for example, 50° C. in the waste-heat recovery and supply unit 18, the temperature of the air is increased by 150° C. using the heater 17, thereby significantly reducing the power consumption.

The recovered heat may also be supplied to the raw-material supply unit 8 and the cold-air supply unit. In the case where heat is supplied to the raw-material supply unit 8, the heating coil (waste-heat recovery device) is arranged near the compressed-gas supply unit 15 located upstream of the raw-material supply unit 8. The liquid heated by the waste-heat recovery device is passed through the heating coil to heat a gas supplied to the raw-material supply unit 8. The same is true for the case where heat is supplied to the cold-air supply unit. In the case where the heat-treatment apparatus includes two or more cold-air supply units, the liquid may be supplied to the cold-air supply unit located at the extreme upstream end of the main body to heat the gas. For example, in the heat-treatment apparatus illustrated in FIG. 1, heat may be supplied to the first cold-air supply unit 3 among the first, second, and third cold-air supply units 3, 4, and 5.

The supply of the liquid heated by the waste-heat recovery coil 18A to the raw-material supply unit 8 and the first cold-air supply unit 3 provides the following effects. After the raw-material toner particles are formed into a spherical shape using hot air, the resulting toner particles need to be immediately cooled and hardened in order to prevent the fusion of the toner particles in the apparatus. In an upstream portion of the toner treatment space, the cold air fed from the first cold-air supply unit 3 and the compressed gas that carries the raw-material toner are mixed with hot air, so that the hot air is cooled. Excessively low temperatures of the compressed gas and the cold air lead to an increase in energy loss. Thus, the compressed gas and the cold air at the extreme upstream end, which particularly affect the temperature of the hot air, are heated in advance to reduce the energy loss. Hence, the temperature of the hot air fed from the hot-air supply unit 2 may be lowered. Furthermore, in the case where heat is supplied to the cold-air supply unit as described above, even if a single cold-air supplier is used, it is possible to increase only the temperature of the cold air fed from the cold-air supply unit located at the extreme upstream end. This eliminates the need to provide a plurality of cold-air suppliers corresponding to the temperatures of cold air, thus simplifying the structure of the apparatus.

Figure 4A:
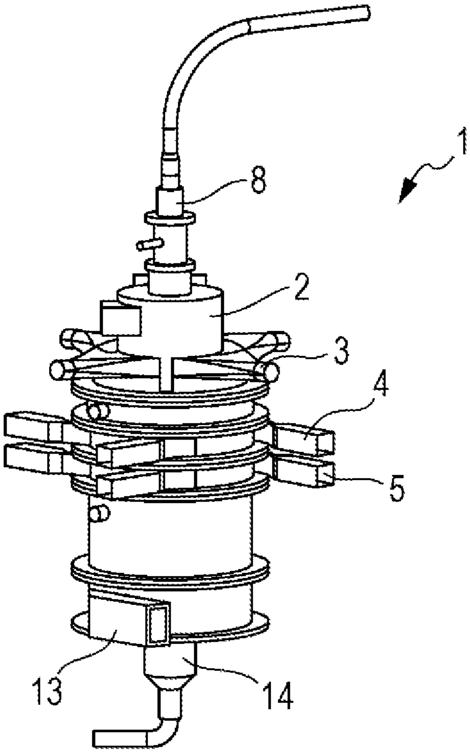
FIGS. 4A to 4C illustrate the main body of an apparatus for heat-treating a toner.
Figure 4B:
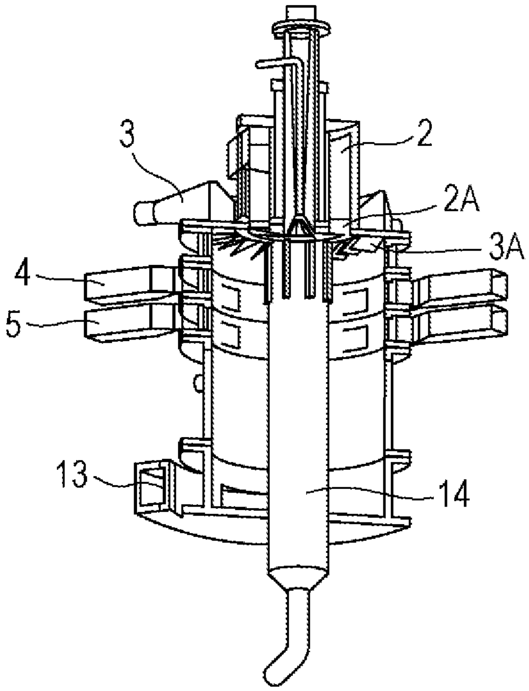
Figure 4C:
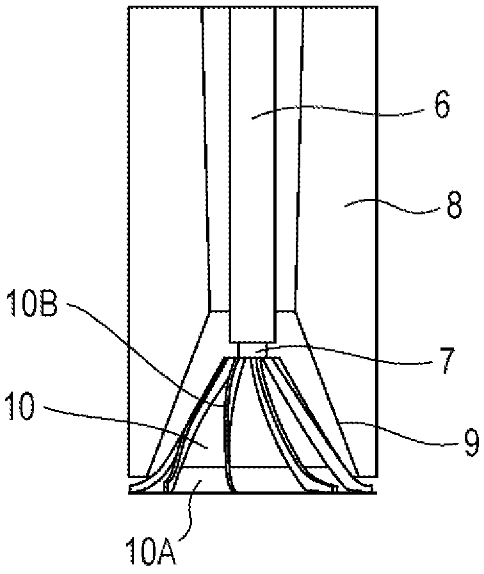

FIGS. 4A to 4C illustrate an exemplary main body of the apparatus for heat-treating a toner that may be used in aspects of the present invention (however, the waste-heat recovery and supply unit and so forth are not illustrated). FIG. 4A illustrates the appearance of the main body of the heat-treatment apparatus. FIG. 4B illustrates the internal structure of the main body of the heat-treatment apparatus. FIG. 4C is an enlarged view illustrating the outlet portion of the raw-material supply unit 8.

The raw-material supply unit 8 includes a radially extending first nozzle 9 and a second nozzle 10 that is arranged inside the first nozzle. The raw-material toner supplied to the raw-material supply unit 8 is accelerated by a compressed gas fed from the compressed-gas supply unit 15 and passes through a space which is located in the outlet portion of the raw-material supply unit 8 and which is defined by the inner side of the first nozzle 9 and the outer side of the second nozzle 10. The raw-material toner is injected circumferentially, outwardly, and circularly into the toner treatment space.

A first tubular member 6 and a second tubular member 7 are arranged in the raw-material supply unit 8. The compressed gas is supplied to the inside of each of the tubular member. The compressed gas passed through the first tubular member 6 is passed through the space defined by the inner side of the first nozzle 9 and the outer side of the second nozzle 10. The second tubular member 7 is arranged through the second nozzle 10. In the second nozzle 10, the compressed gas is injected from the outlet portion of the second tubular member 7 toward the inner surface of the second nozzle 10. A plurality of ribs 10B are provided on the outer peripheral surface of the second nozzle 10. The ribs 10B are curved in the direction of flow of hot air supplied from the hot-air supply unit 2 described below. In a raw-material supply passage extending from the upstream portion of the raw-material supply unit 8 to the first nozzle 9, the diameter of a portion of the raw-material supply unit 8 connected to the first nozzle 9 is designed to be smaller than the diameter of the raw-material supply unit 8 at the extreme upstream end thereof. That is, the second nozzle 10 has a divergent shape such that the diameter is gradually increased from a connection with the second tubular member 7 toward the outlet portion. The reason for this is that the velocity of flow of toner particles supplied is increased at the inlet of the first nozzle 9 to assist the dispersion of the raw-material toner. The slope angle is changed at an end portion adjacent to the outlet portion to provide a barbed portion 10A extending radially.

In the main body of the heat-treatment apparatus illustrated in FIG. 4, the hot-air supply unit 2 is circumferentially provided at a position adjacent to or horizontally spaced from the outer peripheral surface of the raw-material supply unit 8 so as to surround the raw-material supply unit. Furthermore, the first cold-air supply unit 3, the second cold-air supply unit 4, and the third cold-air supply unit 5 are arranged outside and downstream of the hot-air supply unit 2 in order to cool heat-treated toner and prevent coalescence or fusion of the toner particles due to an increase in the internal temperature of the apparatus. The hot-air supply unit 2 may be circumferentially provided at a position horizontally spaced from the outer peripheral surface of the raw-material supply unit 8. The reason for this is to prevent the melting and adhesion of the toner particles ejected from the outlet portion due to the fact that the outlet portions of the first and second nozzles are heated by hot air supplied.

Figure 5:
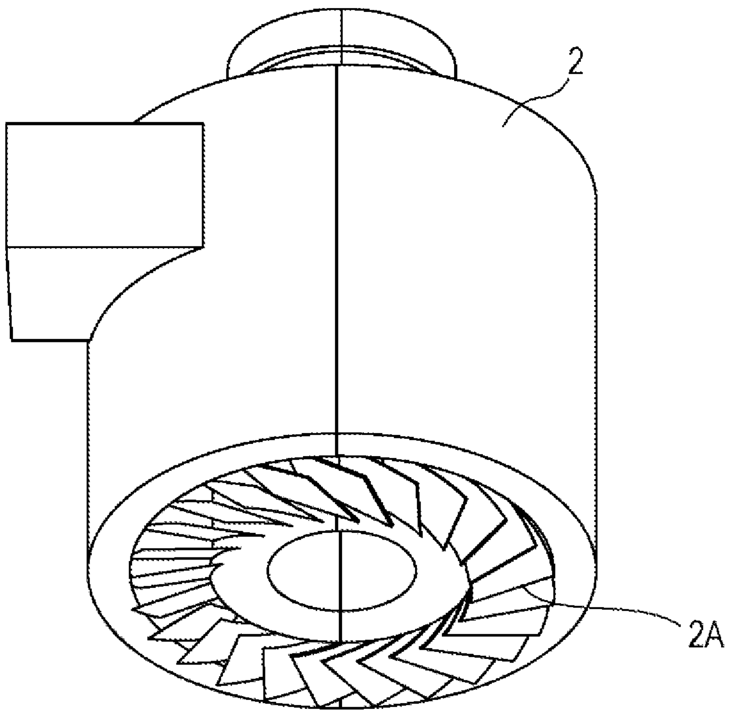
FIG. 5 is a fragmentary perspective view of a hot-air supply unit.

FIG. 5 is a fragmentary perspective view of an example of the hot-air supply unit 2 and an airflow control portion 2A. As illustrated in FIG. 5, the airflow control portion 2A is arranged at the outlet portion of the hot-air supply unit 2, the airflow control portion 2A being configured to supply hot air to the apparatus in such a manner that the hot air is obliquely fed and swirled. The airflow control portion 2A is formed of a louver with a plurality of vanes. The travelling direction of flow of the hot air supplied from the cylindrical hot-air supply unit 2 to the toner treatment space is changed by the louver of the airflow control portion 2A in such a manner that the hot air is swirled in the toner treatment space. The raw-material toner fed from the raw-material supply unit 8 is swirled together with the flow of the hot air. The raw-material toner is heat-treated in the toner treatment space while being swirled, so that all the raw-material toner particles are substantially uniformly heated. This results in the toner particles whose circularity distribution and particle size distribution are narrow.

The number and angle of the louver vanes of the airflow control portion 2A may be desirably adjusted in response to the type of material treated and the throughput. With respect to the tilt angle of the louver vanes of the airflow control portion 2A, the angle of a main surface of each vane to the vertical direction is preferably in the range of 20° to 70° and more preferably 30° to 60°. When the tilt angle of the vanes falls within the above range, a reduction in air velocity in the vertical direction may be suppressed while the hot air is appropriately swirled in the apparatus. Thus, even if the throughput is increased, the toner particles are prevented from coalescing. Furthermore, the frequency of occurrence of toner particles having a degree of circularity of 0.990 or more, which adversely affects the cleaning performance, is suppressed. In addition, the accumulation of heat in the upper portion of the apparatus is prevented, thus leading to high efficiency in energy for production.

Figure 6:
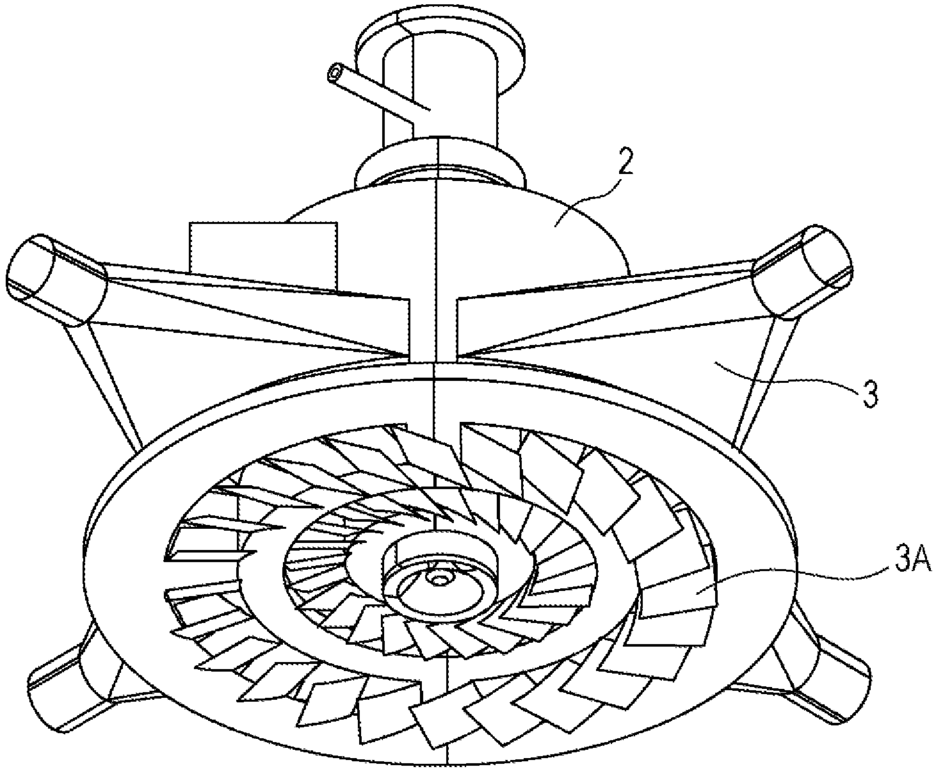
FIG. 6 is a fragmentary perspective view of a cold-air supply unit.

The apparatus for heat-treating a toner according to aspects of the present invention may include a cold-air supply unit. FIG. 6 is a fragmentary perspective view of an example of the first cold-air supply unit 3 and an airflow control portion 3A. As illustrated in FIG. 6, the airflow control portion 3A is arranged at the outlet portion of the first cold-air supply unit 3, the airflow control portion 3A including a louver with a plurality of tilted vanes spaced at regular intervals in such a manner that cold air is swirled in the toner treatment space of the apparatus. With respect to the louver vanes of the airflow control portion 3A, the tilt of the louver vanes is adjusted in such a manner that the cold air is swirled in a direction substantially the same as the swirl direction of the hot air from the hot-air supply unit 2 described above (a direction to maintain the swirl of the raw-material toner in the toner treatment space). This enhances the swirling force of flow of the hot air and suppresses an increase in the temperature of the toner treatment space, thus preventing the fusion of the toner particles on the inner wall of the apparatus or the coalescence of the toner particles.

The number and angle of the louver vanes of the airflow control portion 3A of the first cold-air supply unit 3 may also be desirably adjusted in response to the type of material treated and the throughput. With respect to the tilt angle of the louver vanes of the first cold-air supply unit 3, the angle of a main surface of each vane to the vertical direction is preferably in the range of 20° to 70° and more preferably 30° to 60°. When the tilt angle of the vanes falls within the above range, the flows of the hot air and the toner particles in the toner treatment space of the apparatus are not inhibited. Furthermore, the accumulation of heat in the upper portion of the apparatus is prevented.

In aspects of the present invention, one or more cold-air supply units may be arranged below the hot-air supply unit in addition to the cold-air supply unit described above. In this case, when cold air is supplied to the inside of the apparatus, the cold air may be fed from positions spaced in the vertical direction of the apparatus. For example, in the apparatus illustrated in FIG. 4A, the stream of cold air from each of the first cold-air supply unit 3, the second cold-air supply unit 4, and the third cold-air supply unit 5 is divided into four streams that are separately introduced into the toner treatment space. The reason for this is that a uniform flow of air in the apparatus is easily controlled. The flow rates of the cold air in four separated introducing passages are independently controllable. The second and third cold-air supply unit 4 and 5 may be arranged below the first cold-air supply unit 3 in such a manner that the streams of the cold air are fed horizontally and tangentially from outer peripheral portions of the apparatus.

A cylindrical pole 14 extending from the lowermost portion of the apparatus to the vicinity of the second nozzle 10 is arranged in the axially central portion of the apparatus. Cold air is also fed into the pole 14 and then released from the outer peripheral surface of the pole 14. The pole 14 includes an outlet portion such that the cold air is released in a direction substantially the same as the swirl direction of hot air supplied from the hot-air supply unit 2 and cold air supplied from the first cold-air supply unit 3, the second cold-air supply unit 4, and the third cold-air supply unit 5 (a direction to maintain the swirl of the raw-material toner in the toner treatment space). Examples of the shape of the outlet portion of the pole 14 include slit shapes, louver shapes, perforated-plate shapes, and mesh shapes.

To prevent the fusion of the toner particles, a cooling jacket is arranged on the outer peripheral portion of the raw-material supply unit 8, the outer peripheral portion of the apparatus, and the inner peripheral portion of the hot-air supply unit 2. The cooling jacket may be filled with cooling water or an antifreeze solution, such as ethylene glycol.

With respect to hot air supplied into the apparatus, temperature C (° C.) in the outlet portion of the hot-air supply unit 2 may be in the range of 100° C. to 450° C. When the temperature in the outlet portion of the hot-air supply unit 2 falls within the above range, it is possible to perform treatment to form the toner particles into a spherical shape in such a manner that the toner particles have a substantially uniform particle size and a substantially uniform circularity while the toner particles are prevented from fusing or coalescing due to overheating.

Temperature E (° C.) in the first cold-air supply unit 3, the second cold-air supply unit 4, and the third cold-air supply unit 5 may be in the range of −20° C. to 40° C. When the temperature in the cold-air supply units falls within the above range, it is possible to appropriately cool the toner particles, thereby preventing the fusion or coalescence of the toner particles.

Cooled toner particles are passed through a toner ejecting portion 13 and then recovered. The blower 20 is arranged downstream of the toner ejecting portion 13. The recovered toner particles are conveyed by suction with the blower 20.

The toner ejecting portion 13 is arranged in the lowermost portion of the apparatus and is horizontally arranged on the outer peripheral portion of the apparatus. The toner ejecting portion is connected so as to maintain the flow of the swirl from the upstream portion of the apparatus to the toner ejecting portion.

In the apparatus for heat-treating a toner according to aspects of the present invention, the relationship between the total flow rate (QIN) of the compressed gas, hot air, and cold air fed into the apparatus and the flow rate (QOUT) of the total fluid sucked by the blower 20 may be adjusted to satisfy the expression QIN≤QOUT. When QIN≤QOUT, the injected toner particles are likely to be ejected from the apparatus because of negative pressure in the apparatus, thereby preventing the toner particles from being excessively heated. It is thus possible to prevent an increase in the number of coalescent toner particles or the fusion of toner particles in the apparatus.

The apparatus for heat-treating a toner according to aspects of the present invention may be used in a known method for producing a toner and is not particularly limited. An exemplary procedure for producing a toner by a grinding method will be described below. A raw-material mixing step of mixing a binder resin, a coloring agent, wax, and an additional material, which are toner materials; a melt-kneading step of melt-kneading the toner materials to form a colored resin composition; a cooling step of cooling the colored resin composition; and a grinding step of grinding the colored resin composition are performed to provide powder particles (raw-material toner). The powder particles are subjected to a heat-treatment step of treating the powder particles with the foregoing apparatus for heat-treating a toner, and optionally, a classification step of classifying the heat-treated powder particles, and an addition step of mixing an external additive with the toner particles, thereby providing a toner.

The toner materials and so forth will be described in detail below.

Examples of the binder resin for use in the toner include vinyl resins, polyester resins, and epoxy resins. Among these resins, vinyl resins and polyester resins may be used in view of chargeability and fixability. In particular, when a polyester resin is used, the use of the apparatus provides a significant effect. Examples of polymers that may be optionally mixed with the binder resin include homopolymers and copolymers of vinyl monomers, polyester, polyurethane, epoxy resins, polyvinyl butyral, rosin, modified rosin, terpene resins, phenolic resins, aliphatic and alicyclic hydrocarbon resins, and aromatic petroleum resins. In the case where two or more types of resins are mixed together and used as the binder resin, resins having different molecular weights may be mixed in appropriate proportions.

The binder resin preferably has a glass transition temperature of 45° C. to 80° C. and more preferably 55° C. to 70° C. The binder resin may have a number-average molecular weight (Mn) of 2,500 to 50,000 and a weight-average molecular weight (Mw) of 10,000 to 1,000,000.

As the binder resin, a polyester resin described below may be used. The polyester resin contains 45 to 55 mol % of an alcohol component and 55 to 45 mol % of an acid component with respect to all components. The polyester resin preferably has an acid value of 90 mg KOH/g or less and more preferably 50 mg KOH/g or less. The polyester resin preferably has a hydroxyl value of 50 mg KOH/g or less and more preferably 30 mg KOH/g or less. This is because an increase in the number of end groups of molecular chains increases the environmental dependence of charging characteristics of toner.

The polyester resin preferably has a glass transition temperature of 50° C. to 75° C. and more preferably 55° C. to 65° C. The polyester resin preferably has a number-average molecular weight (Mn) of 1,500 to 50,000 and more preferably 2,000 to 20,000. The polyester resin preferably has a weight-average molecular weight (Mw) of 6,000 to 100,000 and more preferably 10,000 to 90,000.

In the case where the toner is used as a magnetic toner, examples of a magnetic material contained in the magnetic toner are as follows.

Examples thereof include triton tetroxide ($Fe_3O_4$), iron sesquioxide ($\gamma$-$Fe_2O_3$), zinc iron oxide ($ZnFe_2O_4$), yttrium iron oxide ($Y_3Fe_5O_{12}$), cadmium iron oxide ($CdFe_2O_4$), gadolinium iron oxide ($Gd_3Fe_5O_{12}$), copper iron oxide ($CuFe_2O_4$), lead iron oxide ($PbFe_{12}O_{19}$), nickel iron oxide ($NiFe_2O_4$), neodymium iron oxide ($NdFe_2O_3$), barium iron oxide ($BaFe_{12}O_{19}$), magnesium iron oxide ($MgFe_2O_4$), manganese iron oxide ($MnFe_2O_4$), lanthanum iron oxide ($LaFeO_3$), an iron powder (Fe), a cobalt powder (Co), and a nickel powder (Ni). These magnetic materials may be used separately or in combination. In particular, a fine powder of triton tetroxide or $\gamma$-iron sesquioxide may be used.

The magnetic material may be used in an amount of 20 to 150 parts by mass, preferably 50 to 130 parts by mass, and more preferably 60 to 120 parts by mass with respect to 100 parts by mass of the binder resin.

Examples of a non-magnetic coloring agent that may be used for a toner are as follows.

Examples of a black coloring agent include carbon black and a black agent prepared by mixing a yellow coloring agent, a magenta coloring agent, and a cyan coloring agent.

Examples of a color pigment for use in a magenta toner include condensed azo compounds, diketopyrrolopyrrole compounds, anthraquinone, quinacridone compounds, basic dye lake compounds, naphthol compounds, benzimidazolone compounds, thioindigo compounds, and perylene compounds. Specific examples thereof include C.I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 48:2, 48:3, 48:4, 49, 50, 51, 52, 53, 54, 55, 57:1, 58, 60, 63, 64, 68, 81:1, 83, 87, 88, 89, 90, 112, 114, 122, 123, 144, 146, 150, 163, 166, 169, 177, 184, 185, 202, 206, 207, 209, 220, 221, 238, 254, and 269; C.I. Pigment violet 19; and C.I. Vat Red 1, 2, 10, 13, 15, 23, 29, and 35.

The pigment may be used alone as the coloring agent. However, to achieve a good image quality of a full-color image, a combination of a dye and the pigment may improve the degree of definition.

Examples of a color dye for use in a magenta toner include C.I Solvent Red 1, 3, 8, 23, 24, 25, 27, 30, 49, 81, 82, 83, 84, 100, 109, and 121; C.I. Disperse Red 9; C.I. Solvent Violet 8, 13, 14, 21, and 27; oil-soluble dyes, such as C.I. Disperse Violet 1; and basic dyes, such as C.I. Basic Red 1, 2, 9, 12, 13, 14, 15, 17, 18, 22, 23, 24, 27, 29, 32, 34, 35, 36, 37, 38, 39, and 40, and C.I. Basic Violet 1, 3, 7, 10, 14, 15, 21, 25, 26, 27, and 28.

Examples of a color pigment for use in a cyan toner include C.I. Pigment Blue 1, 2, 3, 7, 15:2, 15:3, 15:4, 16, 17, 60, 62, and 66; C.I. Vat Blue 6; C.I. Acid Blue 45; and a copper phthalocyanine pigment having a phthalocyanine skeleton substituted with 1 to 5 phthalimidomethyl groups.

Examples of a color pigment for use in a yellow toner include condensed azo compounds, isoindolinone compounds, anthraquinone compounds, azo metal compounds, methine compounds, and allylamide compounds. Specific examples thereof include C.I. Pigment Yellow 1, 2, 3, 4, 5, 6, 7, 10, 11, 12, 13, 14, 15, 16, 17, 23, 62, 65, 73, 74, 83, 93, 95, 97, 109, 110, 111, 120, 127, 128, 129, 147, 155, 168, 174, 180, 181, 185, and 191; and C.I. Vat Yellow 1, 3, and 20. Furthermore, dyes, such as C.I. Direct Green 6, C.I. Basic Green 4, C.I. Basic Green 6, and Solvent Yellow 162, may also be used.

For the toner, a masterbatch prepared by mixing the coloring agent with the binder resin may be used. The coloring-agent masterbatch and other materials (e.g., the binder resin and wax) are melt-kneaded, thereby satisfactorily dispersing the coloring agent in the toner.

In the case where the coloring agent is mixed with the binder resin to prepare the masterbatch, the dispersibility of the coloring agent is not impaired even if a large amount of the coloring agent is used. Furthermore, the dispersibility of the coloring agent in the toner particles is improved, thus resulting in excellent color reproducibility, such as color mixture characteristics and transparency. Moreover, it is possible to produce a toner having high covering power on a transfer material. In addition, the improvement in the dispersibility of the coloring agent results in excellent stability and durability of the chargeability of the toner, thereby providing a long-lasting high-quality image.

The amount of the coloring agent is preferably in the range of 0.1 to 30 parts by mass, more preferably 0.5 to 20 parts by mass, and particularly preferably 3 to 15 parts by mass with respect to 100 parts by mass of the binder resin.

To further stabilize the chargeability, a charge control agent may be optionally used in the toner. The charge control agent may be used in an amount of 0.5 to 10 parts by mass with respect to 100 parts by mass of the binder resin.

As the charge control agent, the following agents are exemplified. As a negative-charge control agent that permits the toner to be negatively chargeable, organometallic complexes and chelate compounds are effective. Examples thereof include monoazo metal complexes, metal complexes of aromatic hydroxycarboxylic acids, and metal complexes of aromatic dicarboxylic acids. Other examples thereof include aromatic hydroxycarboxylic acids, aromatic mono- and polycarboxylic acids and metal salts thereof, anhydrides thereof, and esters thereof, and phenol derivatives of bisphenols.

Examples of a positive-charge control agent that permits the toner to be positively chargeable include modifications of nigrosin and metal salts of fatty acids; quaternary ammonium salts, such as tributylbenzylammonium 1-hydroxy-4-naphtholsulfonate and tetrabutylammonium tetrafluoroborate, onium salts, such as phosphonium salts, which are analogs thereof, and chelate dyes thereof, such as triphenylmethane dyes, and lake pigments thereof (examples of a lacking agent include phosphotungstic acid, phosphomolybdic acid, phosphotungstomolybdic acid, tannic acid, lauric acid, gallic acid, ferricyanic acid, and ferrocyanides); and metal salts of higher fatty acids, such as diorganotin oxides, e.g., dibutyltin oxide, dioctyltin oxide, and dicyclohexyltin oxide, and diorganotin borates, e.g., dibutyltin borate, dioctyltin borate, and dicyclohexyltin borate.

The toner particles may contain one or more releasing agents, as needed. The following release agents are exemplified.

Examples thereof include aliphatic hydrocarbon wax, such as low-molecular-weight polyethylene, low-molecular-weight polypropylene, microcrystalline wax, and paraffin wax; oxides of aliphatic hydrocarbon wax, such as oxidized polyethylene wax, and block copolymers thereof; wax mainly containing fatty esters, such as carnauba wax, sazol wax, and montanate wax; and compounds, such as deoxidized carnauba wax, prepared by partially or entirely deoxidizing fatty esters. Further examples thereof include straight-chain saturated fatty acids, such as palmitic acid, stearic acid, and montanic acid; unsaturated fatty acids, such as brassidic acid, eleostearic acid, and parinaric acid; saturated alcohols, such as stearyl alcohol, aralkyl alcohols, behenyl alcohol, carnaubyl alcohol, ceryl alcohol, and melissyl alcohol; polyhydric alcohols, such as long-chain alkyl alcohols and sorbitol; fatty acid amides, such as linoleamide, oleamide, and lauramide; saturated fatty acid bisamides, such as methylenebisstearamide, ethylenebiscapramide, ethylenebislauramide, and hexamethylenebisstearamide; unsaturated fatty acid amides, such as ethylenebisoleamide, hexamethylenebisoleamide, N,N'-dioleyl adipamide, and N,N-dioleoyl sebacamide; aromatic bisamides, such as m-xylenebisstearamide, N,N-distearyl isophthalamide; metal salts of fatty acids, such as calcium stearate, calcium laurate, zinc stearate, and magnesium stearate (what is commonly called metallic soap); waxes prepared by grafting vinyl monomers, such as styrene and acrylic acid, to aliphatic hydrocarbon waxes; partially esterified compounds of fatty acids and polyhydric alcohols, such as behenic acid monoglyceride; and hydroxy group-containing ethyl ester compounds prepared by, for example, hydrogenation of vegetable fat and oil.

The amount of the release agent is preferably in the range of 0.1 to 20 parts by mass and more preferably 0.5 to 10 parts by mass with respect to 100 parts by mass of the binder resin. The melting point of the release agent is measured with a differential scanning calorimeter (DSC) and is determined by the peak temperature of the maximum endothermic peak during heating. The melting point of the release agent is preferably in the range of 65° C. to 130° C. and more preferably 80° C. to 125° C.

The toner may contain a fine powder serving as a flowability-improving agent. Examples of the fine powder include fluorine-based resin powders, such as a vinylidene fluoride fine powder and a polytetrafluoroethylene fine powder; fine silica powders, such as silica powders prepared by a wet process and a dry process; fine titanium oxide powders; and fine alumina powders. These powders may be subjected to hydrophobic treatment by surface treatment with, for example, a silane coupling agent, a titanium coupling agent, or silicone oil. In particular, the surface treatment may be performed in such a manner that the degree of hydrophobicity is in the range of 30 to 80, the degree of hydrophobicity being measured by methanol titration.

The flowability-improving agent preferably has a specific surface area of 30 $m^2/g$ or more and more preferably 50 $m^2/g$ or more, the specific surface area being measured by the BET method using nitrogen adsorption.

The toner may further contain another fine inorganic powder which has a polishing effect, imparts chargeability and flowability to the toner, and serves as a cleaning aid. When the fine inorganic powder is externally added to the toner particles, the effects are increased, as compared with those before the addition. Examples of the fine inorganic powder include fine powders composed of titanates and silicates of, for example, magnesium, zinc, cobalt, manganese, strontium, cerium, calcium, and barium. The fine inorganic powder may be used in an amount of 0.1 to 10 parts by mass and even 0.2 to 8 parts by mass with respect to 100 parts by mass of the toner.

The toner may be used for a magnetic one-component developer, a non-magnetic one-component developer, and a two-component developer using the mixture of the toner and a carrier. To successfully provide the effects of aspects of the present invention, the toner may be mixed with a magnetic carrier and used as a two-component developer.

As the magnetic carrier, common magnetic carriers may be used. Specific examples thereof include surface-oxidized iron powders, unoxidized iron powders, particles of metals, such as iron, lithium, calcium, magnesium, nickel, copper, zinc, cobalt, manganese, chromium, and rare earth elements, particles of alloys thereof, particles of oxides thereof, magnetic substances, such as ferrite, and magnetic substance-dispersing resin carriers (called "resin carriers") each containing a magnetic substance and a binder resin in which the magnetic substance is dispersed. In the case where the toner is mixed with the magnetic carrier and used as the two-component developer, with respect to the carrier mixing ratio, a toner concentration of 2% to 15% by mass and even 4% to 13% by mass in the developer usually provides satisfactory results. A toner concentration of less than 2% by mass is likely to cause a reduction in image density. A toner concentration exceeding 15% by mass is likely to cause a fog and scattering in an apparatus. The toner particles treated with the heat-treatment apparatus according to aspects of the present invention may have a weight-average particle size (D4) of 4 μm to 12 μm.

Methods for measuring various physical properties of the toner will be described below.

Method for Measuring Weight-Average Particle Size (D4) and Number-Average Particle Size (D1)

The weight-average particle size (D4) and the number-average particle size (D1) are calculated as described below. A precision grain size distribution measuring apparatus provided with a 100-μm aperture tube based on a pore electrical resistance method, "COULTER COUNTER MULTISIZER 3" (registered trademark, manufactured by Beckman Coulter, Inc.), is used. Dedicated software included with the apparatus "BECKMAN COULTER MULTISIZER 3 Version 3.51" (manufactured by Beckman Coulter, Inc.) is used for setting measurement conditions and analyzing measurement data. The measurement is performed while the number of effective measurement channels is set to 25,000. The measurement data is then analyzed.

An aqueous electrolyte solution prepared by dissolving reagent grade sodium chloride in ion-exchanged water in a concentration of about 1% by mass, for example, an "ISOTON II" (manufactured by Beckman Coulter, Inc.), can be used as an aqueous electrolyte solution to be used in the measurement.

Note that the dedicated software is set as described below prior to the measurement and the analysis.

In the "change standard measurement method (SOM)" screen of the dedicated software, the total count number of a control mode is set to 50,000 particles, the number of times of measurement is set to 1, and a value obtained by using "standard particles each having a particle size of 10.0 μm" (manufactured by Beckman Coulter, Inc.) is set as a Kd value. A threshold and a noise level are automatically set by pressing a "threshold/noise level measurement" button. In addition, a current is set to 1,600 μA, a gain is set to 2, and an aqueous electrolyte solution is set to an ISOTON II, and a check mark is placed in a check box as to whether the aperture tube is flushed after the measurement.

In the "setting for conversion from pulse to particle size" screen of the dedicated software, a bin interval is set to a logarithmic particle size, the number of particle size bins is set to 256, and a particle size range is set to the range of 2 μm to 60 μm.

A specific measurement method is described below.

(1) About 200 mL of the aqueous electrolyte solution is charged into a 250-mL round-bottom glass beaker dedicated for the MULTISIZER 3. The beaker is set in a sample stand. The aqueous electrolyte solution in the beaker is stirred with a stirrer rod at 24 rotations/sec in a counterclockwise direction. Then, dirt and bubbles in the aperture tube are removed by the "aperture flush" function of the analysis software.

(2) About 30 mL of the aqueous electrolyte solution is charged into a 100-mL flat-bottom glass beaker. About 0.3 mL of a diluted solution prepared by diluting a "CONTAMINON N" (a 10% by mass aqueous solution of a neutral detergent for washing a precision measuring device, the detergent containing a nonionic surfactant, an anionic surfactant, and an organic builder and having a pH of 7, manufactured by Wako Pure Chemical Industries, Ltd.) with ion-exchanged water by 3-fold by mass is added as a dispersant to the aqueous electrolyte solution.

(3) An ultrasonic dispersing unit "ULTRASONIC DISPERSION SYSTEM TETRA 150" (manufactured by Nikkaki Bios Co., Ltd.) is used in which two oscillators each having an oscillatory frequency of 50 kHz are built so as to be out of phase by 180°, the ultrasonic dispersing unit having an electrical output of 120 W. A predetermined amount of ion-exchanged water is charged into the water tank of the ultrasonic dispersing unit. About 2 mL of the CONTAMINON N is charged into the water tank.

(4) The beaker in section (2) is set in the beaker fixing hole of the ultrasonic dispersing unit. The ultrasonic dispersing unit is operated. Then, the height position of the beaker is adjusted in such a manner that the liquid level of the aqueous electrolyte solution in the beaker resonates with an ultrasonic wave to the maximum extent possible.

(5) About 10 mg of toner is gradually added to and dispersed in the aqueous electrolyte solution in the beaker in section (4) while the aqueous electrolyte solution is irradiated with the ultrasonic wave. Then, the ultrasonic dispersion treatment is continued for additional 60 seconds. Note that the temperature of water in the water tank is appropriately adjusted so as to be 10° C. to 40° C.

(6) The aqueous electrolyte solution in section (5) in which the toner is dispersed is dropped with a pipette to the round-bottom beaker in section (1) placed in the sample stand, and the concentration of the toner to be measured is adjusted to about 5%. Then, measurement is performed until 50,000 particles are measured.

(7) The measurement data is analyzed with the dedicated software included with the apparatus, and the weight-average particle size (D4) and the number-average particle size (D1) are calculated. An "average size" on the "analysis/volume statistics (arithmetic average)" screen of the dedicated software when the dedicated software is set to show a graph in a vol % unit is the weight-average particle size (D4). An "average size" on the "analysis/number statistics (arithmetic average)" screen of the dedicated software when the dedicated software is set to show a graph in a number % unit is the number-average particle size (D1).

Method for Calculating Fine Particle Content

The fine particle content (number %) of the toner on the basis of number is calculated as described below.

The number % of particles having a particle size of 4.0 μm or less in the toner is calculated by the following procedure. After the measurement with MULTISIZER 3, (1) the chart of the measurement results is displayed in terms of number % by setting the dedicated software to "graph/number %". (2) A check mark is placed in "<" of the particle size-setting portion in the "format/particle size/particle size statistics" screen, and "4" is input in the particle size-inputting portion below the particle size-setting portion. (3) The numerical value in the "<4 μm" display portion when the "analysis/number statistic (arithmetic average)" screen is displayed is the number % of the particles having a particle size of 4.0 μm or less in the toner.

Method for Calculating Coarse Particle Content

A coarse powder content (vol %) of the toner on the basis of volume is calculated as described below.

The volume % of particles having a particle size of 10.0 μm or more in the toner is calculated by the following procedure.

After the measurement with MULTISIZER 3, (1) the chart of the measurement results is displayed in terms of vol % by setting the dedicated software to "graph/vol %". (2) A check mark is placed in ">" of the particle size-setting portion in the "format/particle size/particle size statistics" screen, and "10" is input in the particle size-inputting portion below the particle size-setting portion. (3) The numerical value in the ">10 μm" display portion when the "analysis/volume statistic (arithmetic average)" screen is displayed is the volume % of the particles having a particle size of 10.0 μm or more in the toner.

Measurement of Average Circularity of Toner Particles

The average circularity of the toner particles is measured using a flow-type particle image analyzer "FPIA-3000" (manufactured by Sysmex Corporation) under the same measurement and analysis conditions as in the calibration operation.

Specifically, measurement is performed by adding an appropriate amount of a surfactant, such as an alkylbenzene sulfonate, serving as a dispersant to 20 mL of deionized water, and then adding 0.02 g of a measurement sample to the mixture. The resulting mixture is subjected to dispersion treatment for 2 minutes with a desktop ultrasonic cleaning and disperser (for example, Model "VS-150", manufactured by Velvo-Clear) having an oscillatory frequency of 50 kHz and an electrical output of 150 W, thereby providing a dispersion for measurement. In this case, the dispersion is appropriately cooled so as to have a temperature of 10° C. to 40° C.

The flow-type particle image analyzer provided with a standard objective lens (×10) is used for measurement. A particle sheath "PSE-900A" (manufactured by Sysmex Corporation) is used as a sheath liquid. The dispersion prepared according to the above procedure is introduced into the flow-type particle image analyzer. Then 3000 toner particles are measured by a total count mode in an HPF measurement mode. The binarized threshold during particle analysis is set to 85%. The average circularity of the toner particles is determined by limiting to analyzed particle sizes with a circle-equivalent diameter of 2.00 μm to 200.00 μm.

Before starting the measurement, automatic focusing is performed using standard latex particles (prepared by dilution of, for example, 5200A (manufactured by Duke Scientific Corporation) with deionized water). Then focusing may be performed every two hours from the start of measurement.

In examples of the present invention, a flow-type particle image analyzer which had undergone a calibration operation by Sysmex Corporation and which had received a calibration certificate issued by Sysmex Corporation was used. Measurement was performed under the same measurement and analysis conditions as those at the time of receiving the calibration certificate, except that the particle sizes to be analyzed were limited to analyzed particle sizes with a circle-equivalent diameter of 2.00 μm to 200.00 μm.

EXAMPLES

Production of Toner Particles A

| | |
|---|---|
| Binder resin (polyester resin) (Tg: 58° C., acid value: 25 mg KOH/g, hydroxyl value: 20 mg KOH/g, molecular weight: Mp = 5500, Mn = 2800, Mw = 50000) | 100 parts by mass |

-continued

| | |
|---|---|
| C.I. Pigment Blue 15:3 | 5 parts by mass |
| Aluminum 3,5-di-tert-butylsalicylate | 0.5 parts by mass |
| Fishcher-Tropsch Wax (trade name: FT-100, melting point: 98° C., manufactured by Nippon Seiro Co., Ltd.) | 5 parts by mass |

These materials described above were sufficiently mixed together using a Henschel mixer (Model: FM-75J, manufactured by Mitsui Mining Co., Ltd.). Then the mixture was kneaded with a twin-screw kneader (Model: PCM-30, manufactured by Ikegai Ironworks Corp.) set at 130° C. and a feed rate of 10 kg/hr (the temperature of the kneaded mixture was about 150° C. at the time of ejection). The kneaded mixture was cooled, coarsely ground with a hammer mill, and finely pulverized with a mechanical mill (T-250, manufactured by Turbo Kogyo Co., Ltd.) at a feed rate of 15 kg/hr. Thereby, finely pulverized toner B-1 having a weight-average particle size (D4) of 5.5 μm was produced, in which the proportion of particles having a particle size of 4.0 μm or less was 55.6% by number, and the proportion of particles having a particle size of 10.0 μm or more was 0.8% by volume.

Finely pulverized toner B-1 was classified by a rotary classifier (TTSP100, manufactured by Hosokawa Micron Corporation) at a feed rate of 4.2 kg/hr to remove fine and coarse particles. Thereby, toner particles A having a weight-average particle size of 5.6 μm was produced, in which the proportion of particles having a particle size of 4.0 μm or less was 25.6% by number, and the proportion of particles having a particle size of 10.0 μm or more was 0.2% by volume. Toner particles A had an average circularity of 0.945.

Example 1

In this example, the apparatus for heat-treating a toner had a structure such that heat recovered by the waste-heat recovery and supply unit was used for the hot-air supply unit, the first cold-air supply unit, and the raw-material supply unit on the basis of the production procedure illustrated in FIG. 1. The main body of the heat-treatment apparatus illustrated in FIGS. 4A to 4C was used. Toner particles A (raw-material toner) were heat-treated with the apparatus for heat-treating a toner described above.

The waste-heat recovery and supply unit illustrated in FIG. 2 had a recovery capacity of 10 kW. The heater used in the hot-air supply unit had a rated heater capacity of 115 kW.

The throughput was 15 kg/hr. The operating time was 6 hours after the hot-air temperature was stabilized and the liquid temperature in the waste-heat recovery and supply unit was also stabilized. Furthermore, operating conditions were adjusted in such a manner that treated toner particles A had an average circularity of 0.970.

The hot-air temperature was 145° C. The flow rate of the hot air was 12.0 $m^3$/min. For first cold air fed from the first cold-air supply unit, outside air was taken. The total flow rate of the first cold air was 4.0 $m^3$/min. The total flow rate of second cold air fed from the second cold-air supply unit was 2.0 $m^3$/min. The total flow rate of third cold air fed from the third cold-air supply unit was 2.0 $m^3$/min. The temperature of each of the second cold air and the third cold air was −5° C. The flow rate of injection air fed from the raw-material supply unit was 1.2 $m^3$/min. The temperature of the outside air taken was 11° C. The blower flow rate was 25.0 $m^3$/min. Waste heat from the blower was 70° C. Outside air taken for the hot-air supply unit was heated to 45° C. by the heating coil. Outside air taken for the first cold air was heated to 40° C. by the heating coil. Outside air taken for the injection air was heated to 40° C. by the heating coil. Table 1 summarizes the operating conditions.

The resulting toner particles had a weight-average particle size of 5.8 μm, in which the proportion of particles having a particle size of 4.0 μm or less was 24.6% by number, and the proportion of particles having a particle size of 10.0 μm or more was 1.2% by volume.

The power consumption was evaluated by reading a current value of the heater of the hot-air supply unit. Table 2 illustrates the operation results.

Example 2

In this example, with respect to the production procedure illustrated in FIG. 1, heat recovered was used for the hot-air supply unit and the raw-material supply unit. Toner particles A were heat-treated as in EXAMPLE 1 in such a manner that heat-treated toner particles A had an average circularity of 0.970, except that the operating conditions were changed as described in Table 1. Table 2 illustrates the operation results.

The resulting toner particles had a weight-average particle size of 5.9 μm, in which the proportion of particles having a particle size of 4.0 μm or less was 24.2% by number, and the proportion of particles having a particle size of 10.0 μm or more was 2.1% by volume.

Example 3

In this example, with respect to the production procedure illustrated in FIG. 1, heat recovered was used for the hot-air supply unit. Toner particles A were heat-treated as in EXAMPLE 1 in such a manner that heat-treated toner particles A had an average circularity of 0.970, except that the operating conditions were changed as described in Table 1. Table 1 illustrates the operating conditions. Table 2 illustrates the operation results.

The resulting toner particles had a weight-average particle size of 6.0 μm, in which the proportion of particles having a particle size of 4.0 μm or less was 24.0% by number, and the proportion of particles having a particle size of 10.0 μm or more was 2.8% by volume.

Comparative Example 1

In this comparative example, the main body of the heat-treatment apparatus illustrated in FIGS. 4A to 4C was used on the basis of the production procedure of the related art illustrated in FIG. 3 (that is, waste heat from the blower was not recovered). Toner particles A were heat-treated in such a manner that heat-treated toner particles A had an average circularity of 0.970. Table 1 illustrates the operating conditions. Table 2 illustrates the operation results.

The resulting toner particles had a weight-average particle size of 6.1 μm, in which the proportion of particles having a particle size of 4.0 μm or less was 23.9% by number, and the proportion of particles having a particle size of 10.0 μm or more was 3.8% by volume.

A comparison of EXAMPLES 1, 2, and 3 reveals that a smaller number of portions using the waste-heat recovery and supply unit results in higher power consumption. In other words, the use of the waste-heat recovery and supply unit reduces power consumption during stable operation, thereby enabling energy-efficient production. Table 2 illustrates a power-consumption ratio indicating how much the current value in each example is reduced with respect to the comparative example. A larger number of portions that use heat recovered by the waste-heat recovery and supply unit enables us to reduce the set temperature of the hot air supplied, thereby suppressing the power consumption.

TABLE 1

| | Throughput (kg/hr) | Hot-air temperature (° C.) | Flow rate of hot air ($m^3$/min) | Flow rate of first cold air ($m^3$/min) | Temperature of first cold air (° C.) | Flow rate of second cold air ($m^3$/min) |
|---|---|---|---|---|---|---|
| EXAMPLE 1 | 15 | 145 | 12.0 | 4 | 40 | 2.0 |
| EXAMPLE 2 | ↑ | 155 | ↑ | ↑ | −5 | ↑ |
| EXAMPLE 3 | ↑ | 165 | ↑ | ↑ | ↑ | ↑ |
| COMPARATIVE EXAMPLE 1 | ↑ | 180 | ↑ | ↑ | ↑ | ↑ |

| | Temperature of second cold air (° C.) | Flow rate of third cold air ($m^3$/min) | Temperature of third cold air (° C.) | Injection flow rate ($m^3$/min) | Temperature of injection air (° C.) | Blower flow rate ($m^3$/min) |
|---|---|---|---|---|---|---|
| EXAMPLE 1 | −5 | 2.0 | −5 | 1.2 | 40 | 25.0 |
| EXAMPLE 2 | ↑ | ↑ | ↑ | ↑ | 40 | ↑ |
| EXAMPLE 3 | ↑ | ↑ | ↑ | ↑ | 20 | ↑ |
| COMPARATIVE EXAMPLE 1 | ↑ | ↑ | ↑ | ↑ | ↑ | ↑ |

TABLE 2

| | Current value of heater (A) | Power-consumption ratio* |
|---|---|---|
| Example 1 | 147 | 0.71 |
| Example 2 | 158 | 0.77 |
| Example 3 | 169 | 0.82 |
| Comparative Example 1 | 206 | — |

*"Power-consumption ratio" in Table 2 was calculated using (current value of heater in example)/(current value of heater in comparative example).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-051787 filed Mar. 9, 2011, which is hereby incorporated by reference herein in its entirety.

What is claimed is:

1. An apparatus for heat-treating a toner, comprising:

a raw-material supply unit configured to supply a toner treatment space with a raw-material toner;

a hot-air supply unit configured to heat-treat the raw-material toner in the toner treatment space;

a suction and ejection unit configured to eject hot air used for the heat treatment of the raw-material toner; and a waste-heat recovery and supply unit configured to recover heat from the hot air ejected by the suction and ejection unit and supply the hot-air supply unit with the recovered heat.

2. The apparatus according to claim 1, wherein the waste-heat recovery and supply unit includes a waste-heat recovery device, a waste-heat supply device, and a heat transfer device, wherein the waste-heat recovery device is arranged in the hot air ejected from the suction and ejection unit and recovers heat from the hot air ejected from the suction and ejection unit, the heat transfer device transfers the heat recovered by the waste-heat recovery device to the waste-heat supply device, and the waste-heat supply device supplies the hot-air supply unit with the heat transferred from the heat transfer device.

3. The apparatus according to claim 1, wherein the waste-heat recovery and supply unit supplies the raw-material supply unit with the recovered heat.

4. The apparatus according to claim 1, further comprising:

two or more cold-air supply units, wherein the cold-air supply unit arranged at the extreme upstream end is supplied with the heat recovered by the waste-heat recovery and supply unit.

5. A method for producing a toner, comprising:

a heat treatment step of heat-treating a raw-material toner, wherein in the heat treatment step, the apparatus for heat-treating a toner according to claim 1 is used, and wherein the resulting toner has a weight-average particle size of 4 μm to 12 μm.

* * * * *